(12) United States Patent
Bartoli et al.

(10) Patent No.: US 11,211,674 B2
(45) Date of Patent: Dec. 28, 2021

(54) VALVE SYSTEM FOR AN ELECTROCHEMICAL POWER SUPPLY SOURCE, IN PARTICULAR FOR AN UNDERWATER VEHICLE, AND CORRESPONDING ELECTROCHEMICAL POWER SUPPLY SOURCE

(71) Applicant: LEONARDO S.p.A., Rome (IT)

(72) Inventors: Dino Bartoli, Leghorn (IT); Yuri Gassani, Leghorn (IT)

(73) Assignee: LEONARDO S.p.A., Rome (IT)

( * ) Notice: Subject to any disclaimer, the term of this patent is extended or adjusted under 35 U.S.C. 154(b) by 15 days.

(21) Appl. No.: 16/818,460

(22) Filed: Mar. 13, 2020

(65) Prior Publication Data

US 2020/0295343 A1    Sep. 17, 2020

(30) Foreign Application Priority Data

Mar. 15, 2019    (IT) .......................... 102019000003845

(51) Int. Cl.
| | | |
|---|---|---|
| *H01M 50/00* | (2021.01) | |
| *H01M 50/77* | (2021.01) | |
| *F42B 19/24* | (2006.01) | |
| *H01M 10/42* | (2006.01) | |

(Continued)

(52) U.S. Cl.
CPC ............. *H01M 50/77* (2021.01); *F42B 19/24* (2013.01); *H01M 10/4214* (2013.01); *H01M 50/60* (2021.01); *H01M 50/691* (2021.01); *H01M 2220/20* (2013.01)

(58) Field of Classification Search
CPC ................... H01M 50/77; H01M 6/34; H01M 2300/0002; H01M 50/60; H01M 6/04
See application file for complete search history.

(56) References Cited

U.S. PATENT DOCUMENTS

| | | | |
|---|---|---|---|
| 2015/0263354 A1* | 9/2015 | Mazzeschi ............ | H01M 50/77 429/119 |
| 2018/0248215 A1* | 8/2018 | Fujita .................... | H01M 8/188 |
| 2019/0013534 A1* | 1/2019 | Kim .................. | H01M 8/04276 |

(Continued)

FOREIGN PATENT DOCUMENTS

| | | |
|---|---|---|
| JP | S59 127378 | 7/1984 |
| JP | S63 213261 | 9/1988 |

*Primary Examiner* — Cynthia H Kelly
*Assistant Examiner* — Monique M Wills
(74) *Attorney, Agent, or Firm* — Leason Ellis LLP

(57) ABSTRACT

An electrochemical-type power supply source is provided with: an electrochemical stack generating electric power, in the presence, internally, of electrolytic fluid, provided with a number of distinct groups of galvanic cells and of a corresponding number of electrolyte inlet pipes for introducing electrolyte into respective groups of galvanic cells and with electrolyte outlet pipes for extracting electrolyte from respective groups of galvanic cells; a main tank, fluidically coupled to the electrochemical stack and containing electrolytic fluid; and a recirculation system, defining a circulation path of the electrolytic fluid between the main tank and the electrochemical stack. A valve system that can be coupled to the electrolyte inlet and/or outlet pipes and operatively controllable to modify hydraulic and electric characteristics of the circulation path, in response to a power delivery condition by the power supply source.

13 Claims, 4 Drawing Sheets

(51) Int. Cl.
*H01M 50/60* (2021.01)
*H01M 50/691* (2021.01)

(56) References Cited

U.S. PATENT DOCUMENTS

2020/0075985 A1* 3/2020 Kocherginsky ....... H01M 12/08
2020/0161685 A1* 5/2020 Song ................. H01M 8/04186

* cited by examiner

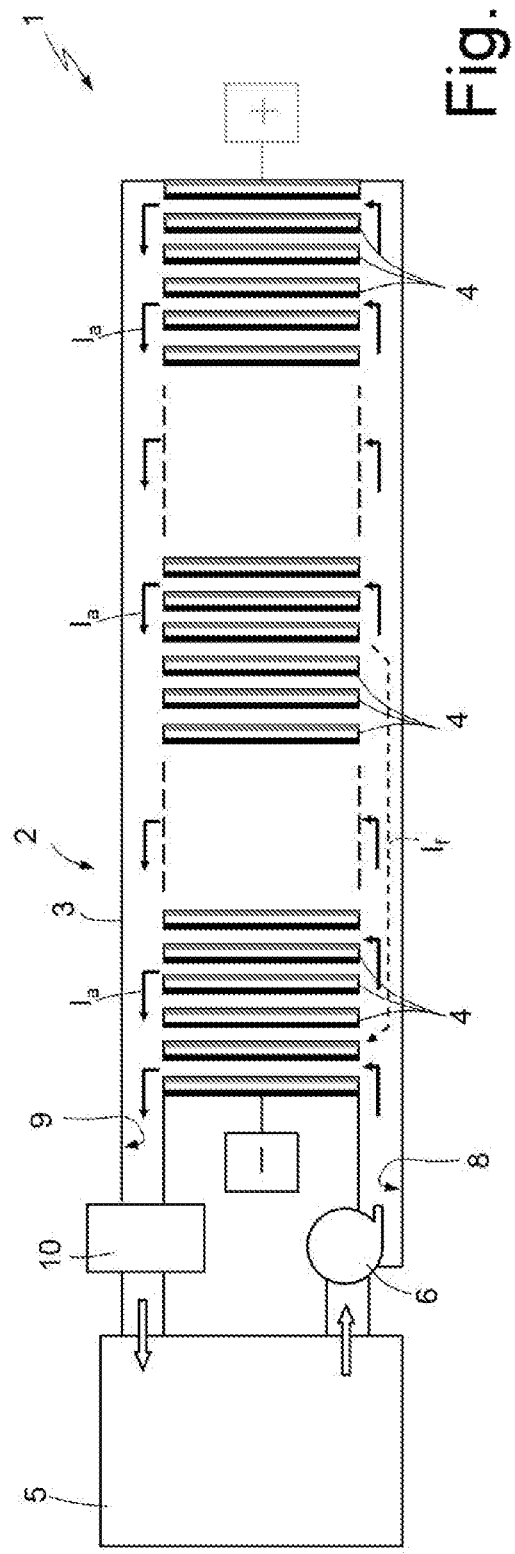
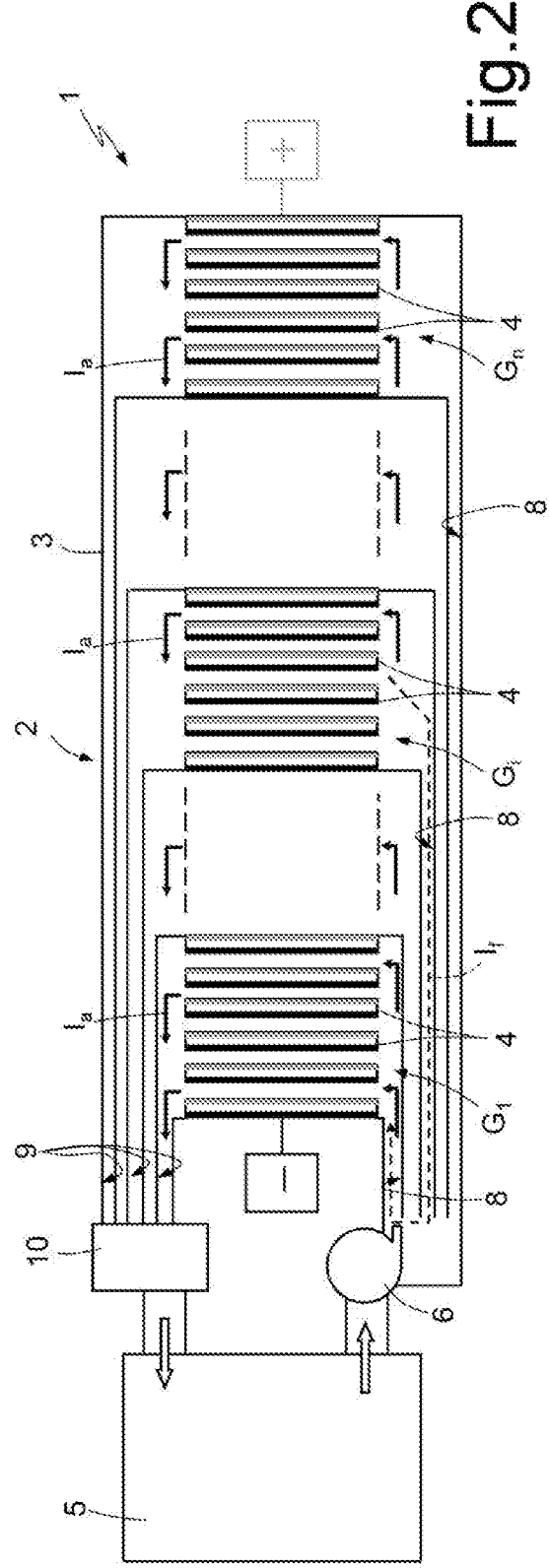

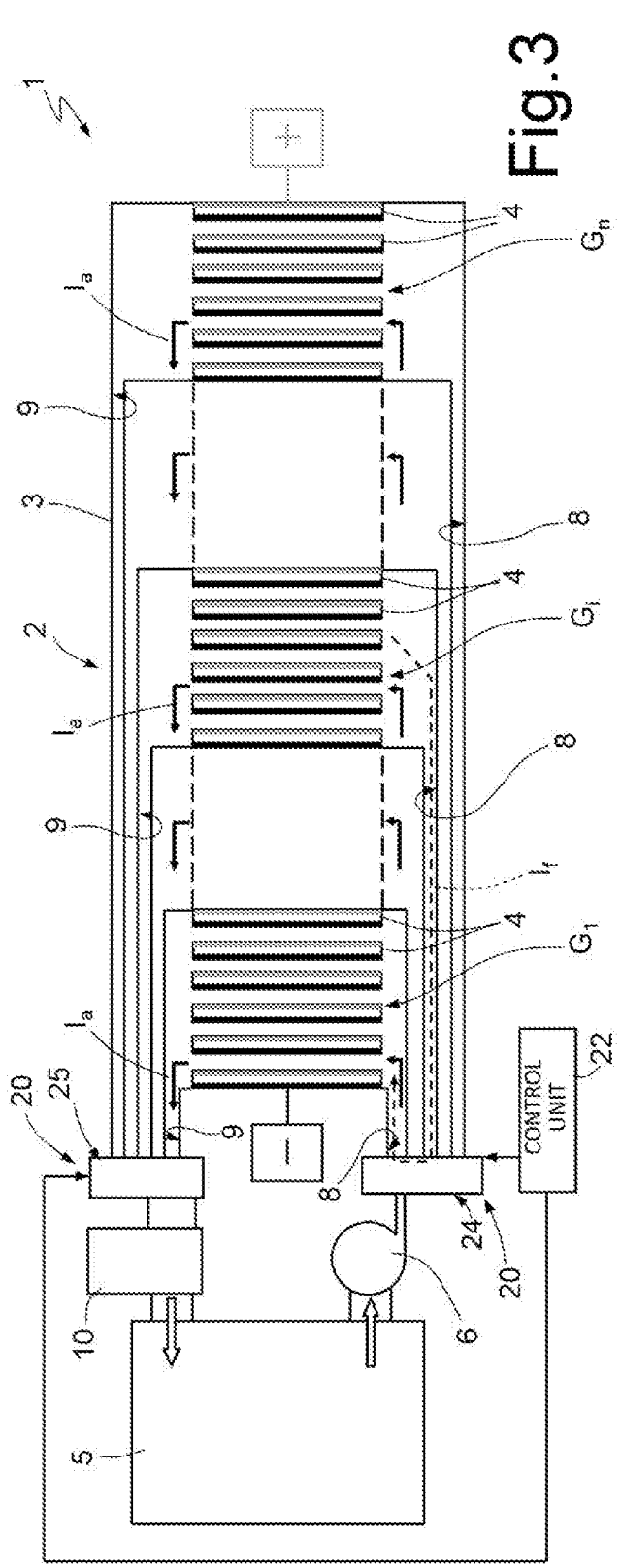

VALVE SYSTEM FOR AN ELECTROCHEMICAL POWER SUPPLY SOURCE, IN PARTICULAR FOR AN UNDERWATER VEHICLE, AND CORRESPONDING ELECTROCHEMICAL POWER SUPPLY SOURCE

CROSS-REFERENCE TO RELATED APPLICATIONS

This patent application claims priority from Italian patent application no. 102019000003845 filed on Mar. 15, 2019, the entire disclosure of which is incorporated herein by reference.

TECHNICAL FIELD

The present solution relates to a valve system for an electrochemical power supply source, in particular for use in a marine environment, in an underwater vehicle.

BACKGROUND ART

Electrochemical-type power supplies sources (so-called electrochemical "stacks" or "batteries"), for example of the aluminium-silver oxide (Al—AgO) type, are used in underwater vehicles, for example for military use (such as torpedoes), for the propulsion and/or for supplying electric power to corresponding on board electrical systems.

As it is known, an electrochemical-type power supply source comprises an electrochemical stack, consisting of galvanic cells containing at least two electrodes (anode and cathode), typically made of metal materials with a different electronegative potential, which are supplied by an electrolytic fluid.

FIG. 1 schematically shows an electrochemical-type power supply source 1, which comprises an electrochemical stack 2 housed in an appropriate container 3, typically watertight, and comprising a plurality of galvanic cells 4 supplied by electrolytic fluid and connected in series, each one provided with a corresponding pair of cathode (positive electrode, indicated by '+') and anode (negative electrode, indicated by '−') electrodes.

The electrolytic fluid, which typically undergoes a rise in temperature when it is inside the electrochemical stack 2, due to exothermic reactions occurring for producing electric energy, is extracted from the electrochemical stack 2 and introduced into a main tank 5, fluidically coupled to the same electrochemical stack 2. The electrolytic fluid is then reintroduced from the main tank 5, with a recirculation continuous process, into the electrochemical stack 2, after possibly undergoing one or more treatment or conditioning processes.

In particular, the electrolytic fluid is drawn from the main tank 5 by means of a pump device 6 (or by a similar fluid delivery device) and introduced, pressurized, into the electrochemical stack 2 through an electrolyte inlet pipe 8, which supplies in parallel all the galvanic cells 4.

The electrolytic fluid is then extracted from the electrochemical stack 2 through an electrolyte extraction pipe 9, connected once again in parallel to the galvanic cells 4, subjected to a conditioning process in an appropriate conditioning device 10 (for example a cooling process, a process for separating gas components, a mechanically filtering process, etcetera) and re-introduced into the main tank 5. It is noted that the aforesaid conditioning process depends on the effects produced on the electrolytic fluid by the oxide-reduction reaction and by other secondary reactions occurring in the galvanic cells 4.

The electrolytic fluid turnover inside the electrochemical stack 2 is generally accelerated as the power delivered by the power supply source 2 increases, as the effects which the electrolytic fluid is subjected to are normally linked to the power delivered.

A problem afflicting the electric and hydraulic architecture described for the aforesaid power supply source 1 is linked to the so-called "leakage currents", which reduce the yield of the power supply source 1 and which compromise the efficiency thereof.

The electrolytic fluid is in fact a liquid rich in ions and therefore conductive; furthermore, galvanic cells 4, being connected in series, have potential values gradually increasing along the longitudinal extension of the electrochemical stack 2. The electrolytic fluid is in contact with the various electrodes at different potential and therefore it carries additional currents besides the currents useful for generating electric power inside the galvanic cells 4 (indicated by $I_a$ in FIG. 1).

Such undesired additional currents flow through the electrolyte inlet and outlet pipes 8, 9 and their extent depends on the difference of potential of the galvanic cells 4, which the corresponding electrolytic fluid portion is in contact with, and on the electric resistance value which characterizes the same electrolytic fluid portion that connects the galvanic cells 4.

These undesired currents, defined as "leakage currents", indicated by $I_f$ and whose exemplary path is represented by the dotted line in the aforesaid FIG. 1, determine an energy consumption which lowers the yield and thus reduces the power supply source 1 duration.

Such yield reduction is particularly significant when the power delivered by the power supply source 1 is low. The energy yield η is in fact defined as:

$$\eta = \text{Power delivered}/(\text{Power delivered} + \text{Power dissipated})$$

wherein the dissipated power, inside the power supply source 1, is mainly due to two factors: power dissipated due to the aforesaid leakage currents; and power dissipated to electrically supply the pump device 6, to circulate the electrolytic fluid, and to supply the management and control electronics of the power supply source 1 (not illustrated in FIG. 1).

It is clear that when the delivered power is low, even the yield is low (equal to 50% if it is equal to the power dissipated internally), while when the delivered power is medium-high the yield is good (>75% if it is three times greater than the power dissipated internally).

One solution suggested to reduce leakage currents, schematically illustrated in FIG. 2, provides dividing the electrochemical stack 2 into a given number n of groups of galvanic cells 4, each of which is coupled to the main tank 5 with a respective electrolyte inlet and outlet pipe, associated therewith.

The galvanic cells 4 of the electrochemical stack 2 are thus divided into n groups (indicated in FIG. 2 as $G_1 \ldots G_i \ldots G_n$), distinct from each other and associated with a respective electrolyte inlet pipe 8 and a respective electrolyte outlet pipe 9, also distinct and separated from each other. The electrolyte inlet pipes 8 are all fluidically coupled at the inlet of the pump device 6, and the electrolyte outlet pipes 9 are all fluidically coupled at the outlet of the conditioning device 10.

Such solution has the advantage of increasing the electric resistance of the electrolyte portions that mutually connect the groups of galvanic cells 4 and thus of reducing leakage currents (once again indicated by $I_f$ and whose exemplary path is once again illustrated by a dotted line in FIG. 2). The leakage current path between a group of galvanic cells 4 and the other passes through two different electrolyte inlet or outlet pipes 8, 9 that connect the two groups, with an increased length and reduced section with respect to the solution of FIG. 1, leading to an increase in resistance of the fluid portion housing the leakage currents.

It is indeed noted that the electric resistance is given by:

$$R = \rho * L/S,$$

where: $\rho$ is the electrolyte resistivity [$\Omega$*cm]; L the pipe length [cm]; and S the pipe section [cm$^2$].

This solution allows to obtain a certain reduction of leakage currents, obtaining corresponding improvement of yield if compared to the solution of FIG. 1.

The present Applicant has however realized that also this solution maintains, in practical applications, a low yield level when the power delivered is low. In other words, the power supply source 1 allows to reach the desired yields only if discharged at high power.

For the type of use it is intended for, for example, a military-type use (within a torpedo), this discharge condition at high power however cannot be ensured, as the underwater vehicle responds to a rationale related to the "mission" it must carry out, therefore providing periods with low-power absorption and periods with medium-high power absorption.

DISCLOSURE OF INVENTION

The aim of the present invention is to provide a solution that allows to solve the previously highlighted problems and that particularly allows to further improve the electrochemical power supply source yield, limiting the effect of leakage currents.

BRIEF DESCRIPTION OF THE DRAWINGS

According to the present invention an electrochemical power supply source is provided, as described in the appended claims.

To better understand the present invention preferred embodiments thereof will be now described, for exemplary and non-limiting purposes, with reference to the appended claims, wherein:

FIG. 1 is a general block diagram of an electrochemical power supply source, of a known type;

FIG. 2 is a general block diagram of a further electrochemical power supply source, also of a known type;

FIG. 3 is a general block diagram of an electrochemical power supply source, according to an embodiment of the present solution;

FIGS. 4A-4B schematically show possible variants of electrolyte inlet and outlet pipe arrangements in the electrochemical power supply source of FIG. 3;

BEST MODE FOR CARRYING OUT THE INVENTION

Figure 5:
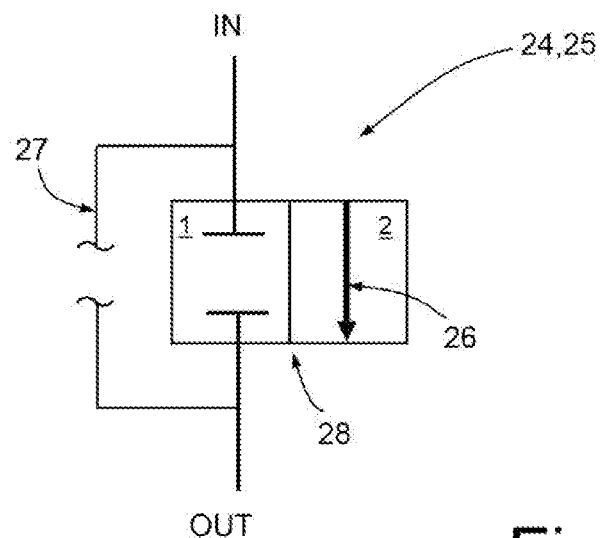
FIG. 5 is an equivalent hydraulic diagram of a valve arrangement in the electrochemical power supply source of FIG. 3.

As it will be hereinafter described in detail, an aspect of the present solution envisages introducing into the electrochemical power supply source a valve system which allows to improve yield when a low-power is delivered, therefore increasing (in these operating conditions) the power supply source duration; a further aspect of the present solution envisages an appropriate algorithm for managing power delivered by the power supply source.

Based on what discussed above, improving the yield of the power supply source 1 requires:

reducing the power dissipated due to leakage currents; and/or reducing the power dissipated for supplying the pump device 6 for the circulation of the electrolytic fluid.

An aspect of the present solution provides increasing the electrical resistance of the electrolytic fluid circulation pipes for the groups of galvanic cells 4, introducing, in series to each pipe, a secondary pipe of appropriate length and reduced section, by means of an appropriate valve arrangement, later described in detail. The introduction of such secondary pipe has as a main effect the increase of electrical resistance of the fluid portion housing leakage currents and as a counter-effect the increase of pressure losses and accordingly power absorbed by the pump device 6.

The present Applicant has however realized that, when the power supply source 1 delivers low power, the electrolytic fluid flow rate can be reduced, as the electrolyte turnover can be carried out more slowly, being the effects generated thereon equally slowly. This flow rate reduction has two beneficial effects: the reduction of the power absorbed by the pump device 6; and the reduction of pressure loss in the pipes for the circulation of the electrolytic fluid for the galvanic cells 4.

It is therefore possible to determine an appropriate size for the aforesaid secondary pipe so as to balance the effects associated to pressure losses and ensure in any case a general improvement of the energy yield of the power supply source 1.

The operation principle underlying the present solution provides that, when the power supply 1 is required to deliver low power, the electrolytic fluid is introduced through a high electric-resistance hydraulic circuit (the aforesaid secondary pipe defined by the valve arrangement) for reducing leakage currents; advantageously, in this condition, the electrolytic fluid flow rate is further reduced in order to offset the counter-effect of pressure-loss increase associated with the aforesaid secondary pipe.

When the power supply source 1 is instead required to deliver a medium-high power, the secondary pipes are bypassed by the valve arrangement and the electrolyte flow rate is appropriately increased, as required by the operating conditions for the appropriate recirculation of the electrolytic fluid.

FIG. 3 shows an electrochemical-type power supply source, once again indicated by 1, wherein the described solution is implemented (it is noted that similar reference numbers are used to indicate elements already previously described, which are not herein once again described in detail). In particular, the power supply source 1 is made in a substantially similar way to what discussed with reference to FIG. 2, having therefore a certain number n of distinct groups ($G_1 \ldots G_i \ldots G_n$) of galvanic cells 4 and of respective electrolyte inlet and outlet pipes 8, 9 associated therewith.

For exemplary purposes, FIG. 4A shows a possible arrangement of the aforesaid electrolyte inlet and outlet pipes 8, 9, in the example in a number of five, in particular a circular arrangement around a longitudinal extension axis; while FIG. 4B shows a further possible arrangement, that is linear in a direction transversal to the longitudinal extension axis, of the electrolyte inlet and outlet pipes 8, 9, in this case also in a number of five. In both cases, the electrolyte inlet and outlet pipes 8, 9 are coupled to a support body 15.

According to a particular aspect of the present solution, the power supply source 1 comprises a valve system 20, coupled to the electrolyte inlet and outlet pipes 8, 9, arranged for example at an external wall of the container 3 of the electrochemical stack 2.

Such valve system 20 can be operatively controlled by an electronic control unit 22 (for example the management electronics of the power supply source 1), having a microcontroller processing unit (or microprocessor, DSP—Digital Signal Processor, or similar digital processing element), to modify at the same time the hydraulic and electric characteristics of the electrolytic fluid circulation circuit, in particular in a low-power delivery condition by the power supply source 1.

In detail, the valve system 20 comprises:

an inlet valve arrangement for each electrolyte inlet pipe 8 (indicated as a whole by 24), each one coupled with the inlet of a respective electrolyte inlet pipe 8, downstream of the pump device 6, from which it receives the delivered electrolytic fluid; and an outlet valve arrangement for each electrolyte outlet pipe 9 (indicated as a whole by 25), each one coupled with the outlet of a respective electrolyte outlet pipe 9, upstream of the pump device 10, to which it delivers the electrolytic fluid at the outlet.

As schematically illustrated in FIG. 5, each inlet or outlet valve arrangement 24, 25 has an inlet IN for introducing the electrolytic fluid (from the pump device 6 in case of an inlet valve arrangement 24, or from the outlet of the respective electrolyte outlet pipe 9 in case of an outlet valve arrangement 25) and an outlet OUT for the outflow of the electrolytic fluid (towards the inlet of the respective electrolyte introduction pipe 8 in case of the inlet valve arrangement 24, or towards the conditioning device 10 in case of the outlet valve arrangement 25).

Each inlet and outlet valve arrangement 24, 25 comprises:

a direct fluidic path (so-called "bypass" path) 26, which fluidically connects the inlet IN and the outlet OUT by means of a path with a high section and a low length (i.e. with a low length/section ratio);

a secondary fluidic path 27, which fluidically connects the respective inlet IN and the respective outlet OUT by means of a path with a low section and a high length, (i.e. with a high length/section ratio); and a valve device 28, operable in a first position (indicated by '1' in FIG. 5) in which it closes, alternatively in a second position (indicated by '2' in FIG. 5) in which it opens, the direct fluidic path 26 between the inlet IN and the outlet OUT.

The aforesaid valve device 28 is electronically operated by the electronic control unit 22, depending on the operative condition of the power supply source 1.

In particular, in a low-power delivery phase by the power supply source 1, the electronic control unit 22 controls the valve device 28 in the first position, so that flow of the electrolytic fluid between the inlet IN and the outlet OUT occurs through the secondary fluidic path 27, having a high length/section ratio. This actually increases the electric resistance of the portion flown by the electrolytic fluid, consequently reducing the leakage current flowing therein, and, as a counter-effect, a corresponding increase in hydraulic pressure loss.

In this regard, FIG. 3 shows once again by a dotted line a possible leakage current path, indicated by $I_f$, between two different groups $G_1$, $G_i$ of galvanic cells 4; in particular, it is noted that such path is closed through the valve arrangements associated with the respective electrolyte fluid circulation pipes.

In a phase of medium-high power delivery by the power supply 1, the electronic control unit 22 controls instead the valve device 28 in the second position, so that passage of the electrolytic fluid between the inlet IN and the outlet OUT occurs through the direct fluidic path 26, having a high section and a low length, so as to reduce the hydraulic pressure loss.

The command for switching from the first position to the second position can be advantageously provided simultaneously to all the inlet and outlet valve arrangements 24, 25, coupled to the various electrolyte inlet and outlet pipes 8, 9, upon switching from the low-power delivery phase to the medium-high power delivery phase by the power supply source 1.

Note that such switching from the first position to the second position, which worsens in any case the configuration with respect to leakage currents (increasing them), is however required to avoid an excessive increase of power required by the pump device 6 for the circulation of the electrolytic fluid (due to the request to increase the electrolyte flow rate for conditioning requirements thereof, as previously indicated). In these conditions, the pump device 6 would entail, in the portion of the secondary fluidic path 27 (with low section) a hydraulic power requirement (about proportionate to the cubed fluid speed), and hence consumption, such as to hinder the improvement in the system energy yield.

According to an aspect of the present solution, during the low-power delivery phase, the electronic control unit 22 (or the management unit of the electronic power supply 1, in case they do not coincide) is further configured to appropriately reduce the electrolytic flow rate circulating in the electrochemical stack 2 (delivered from the pump device 6), since, in these operating conditions, the electrolyte turnover can occur more slowly.

As above indicated, such flow rate reduction (and the corresponding reduction of pressure loss in the pipes where the electrolytic fluid circulates for the galvanic cells 4) can advantageously balance the increase in the hydraulic pressure loss occurring due to the passage of the electrolytic fluid through the secondary fluidic path 27 in the valve system 20.

Figure 6:
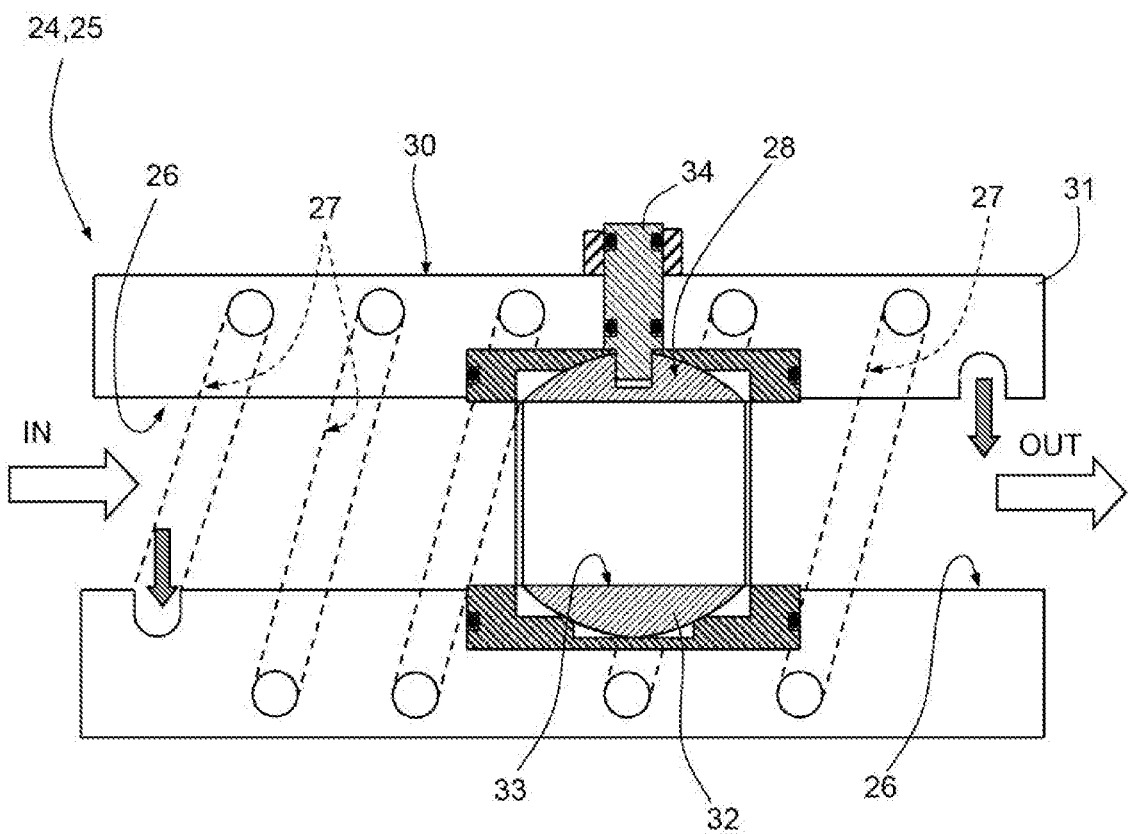
FIG. 6 schematically shows a possible embodiment of the valve arrangement of FIG. 5.

FIG. 6 shows a possible implementation of the aforesaid inlet and outlet valve arrangements 24, 25, where each valve arrangement comprises a main body 30 having longitudinal extension.

Such main body 30 defines an outer wall 31 and, internally to such outer wall 31, a fluidic duct that represents the aforesaid primary fluidic path 26 (having high section and low length) between the inlet IN and the outlet ON.

In the outer wall 31, by removal of material, the aforesaid secondary fluidic path 27 is formed, being defined in this case by a coiled duct which extends (with low section and high length) along the longitudinal extension direction of the main body 30. In particular, such secondary fluidic path 27 has an inlet portion at the inlet IN and an outlet portion at the outlet OUT of the valve arrangement (as schematically indicated by the arrows in FIG. 6).

The valve arrangement 28 is represented in this case by a ball valve, having a shutter 32 arranged centrally with respect to the main body 30 and provided with a cavity 33 coaxial to the primary fluidic path 26; the shutter 32 is controllable in rotation by an actuator 34 between a first position, in which it closes the aforesaid primary fluidic path 26, (forcing the electrolytic fluid to flow along said secondary fluidic path 27), and a second position, in which it opens said primary fluidic path 26 which is then traversed by the electrolytic fluid flowing between the inlet IN and the outlet OUT.

Advantageously, a single actuator 34 for the valve devices 28 of the inlet and/or outlet valve arrangements 24, 25 can be provided.

As previously discussed, the power supply source 1 can be advantageously employed inside an underwater vehicle, for example a torpedo.

Figure 7:
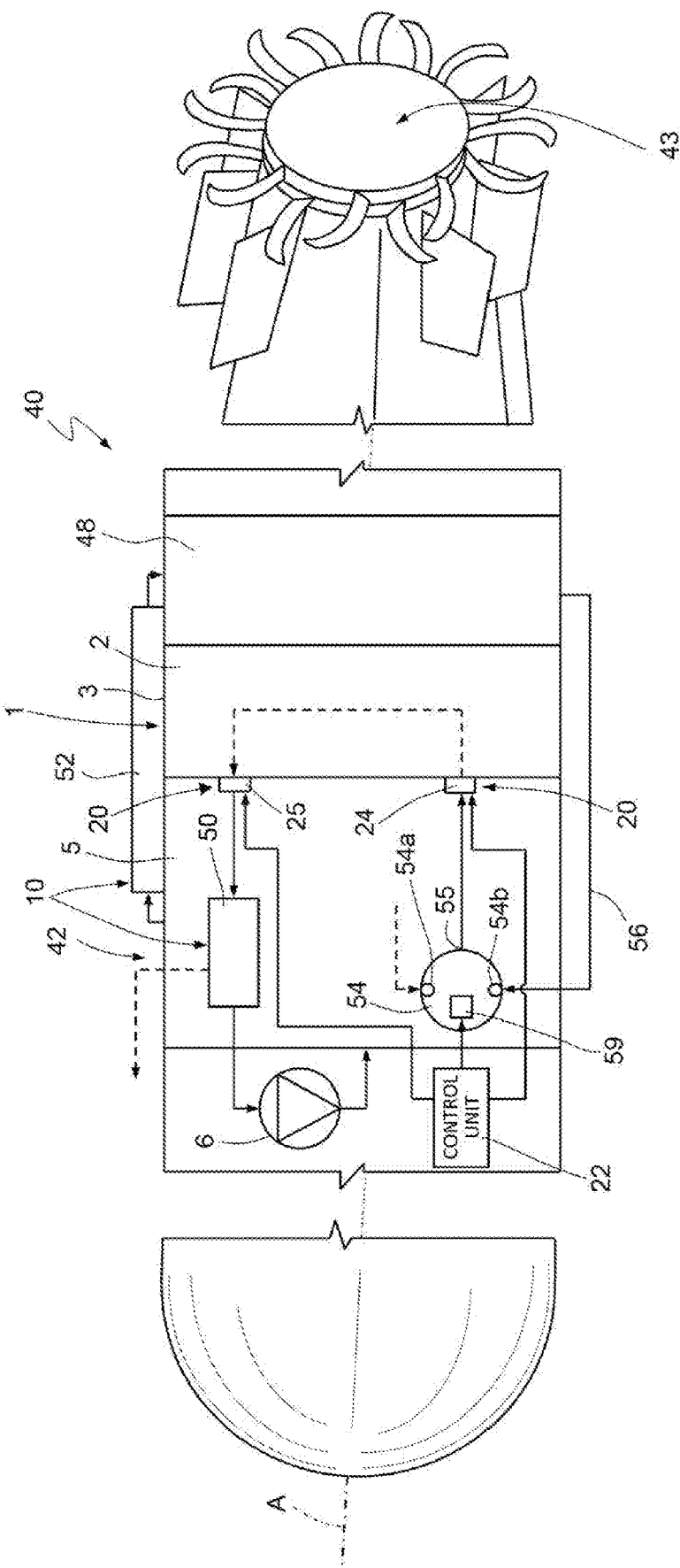
FIG. 7 is a general block diagram of an underwater vehicle, provided with the electrochemical power supply source of FIG. 3.

In this regard, FIG. 7 shows a portion of an underwater vehicle, generally indicated by 40, for example a torpedo, comprising a tubular body, with a longitudinal extension axis A, having a central section within which a chamber 42 is defined, housing the power supply source 1 and the associated electrochemical stack 2, which delivers electric power supply to a propulsion system 43 of the underwater vehicle 40 and/or to on board electronic apparatuses (not illustrated herein).

In a position adjacent to the electrochemical stack 2, at the aforesaid central portion of the underwater vehicle 40, the power supply source 1 has the main tank 5 (at the front of the electrochemical stack 2 with respect to the longitudinal axis A, thus also defined as "front tank") and a second tank 48 (at the back of the same electrochemical stack 2 with respect to the same longitudinal axis A, thus defined as "back tank"), designed to respectively contain a high-temperature electrolytic fluid (so called "hot electrolytic fluid") and a low-temperature electrolytic fluid (so called "cold electrolytic fluid").

The hot electrolytic fluid, drawn from the inside of the electrochemical stack 2, is introduced into a separator 50, of the fluid-to-gas phase type, having: an inlet in fluidic communication with the aforesaid electrochemical stack 2 (through the previously described valve system 20, in particular through the outlet valve arrangement 25); a first outlet coupled to the outside of the underwater vehicle 40, for ejecting reaction gases, mainly hydrogen ($H_2$); and a second outlet for outputting liquid, separated from the aforesaid reaction gases (note that such separator 50 acts in this case as part of the aforesaid conditioning device 10).

The liquid is re-introduced into the main tank 5, pressurized, by means of the pump device 6, for example of the centrifugal type, which has an inlet coupled to the aforesaid second outlet of the separator 50 and a respective outlet coupled inside the main tank 5.

Part of the hot electrolytic fluid contained in the main tank 5 is further appropriately directed towards the inlet of a heat exchanger 52, which for example consists of a gap formed inside the central portion of the underwater vehicle 40 and having an outer wall directly contacting the seawater outside the underwater vehicle 40. The heat exchanger 52 has an outlet fluidically connected with the inside of the second tank 48, such that the electrolytic fluid, once cooled, reaches the second tank 48 (note that the heat exchanger 52 also acts in this case as part of the aforementioned conditioning device 10).

The pump device 6 pressurizes the main tank 5, the second tank 48 and the aforesaid heat exchanger 52, which fluidically connects the main and the second tanks 5, 48.

In the embodiment illustrated in FIG. 7, the pump device 6 is arranged outside the chamber 42, in an external portion, in a so-called "dry" zone, i.e. not contacting the electrolytic fluid and the seawater.

The power supply source 1 further comprises a thermostatic valve 54, which enables mixing, at desired quantity, lower-temperature electrolytic fluid with higher-temperature electrolytic fluid, and introducing the mixed fluid, at a desired and controlled temperature, into the electrochemical stack 2 (through the above described valve system 20, in particular through the inlet valve arrangement 24); in the illustrated embodiment, the thermostatic valve 54 is inside the main tank 5, immersed in the hot electrolytic fluid contained therein.

In particular, the thermostatic valve 54 has: a first mixing inlet 54a fluidically connected to the main tank 5, consisting of an opening in fluidic communication with the main tank 5, by interposition of an appropriate filtering element, so as to receive the hot electrolytic fluid delivered from the pump device 6; a second mixing inlet 54b, fluidically connected to the second tank 48 by a connecting duct 56, so as to receive the electrolytic fluid appropriately cooled by the heat exchanger 52; and a fluid outlet 55, at which it provides mixed electrolytic fluid at a temperature adjusted at a desired value, to be introduced into the electrochemical stack 2 (through the aforesaid valve system 20).

An actuator 59 of the thermostatic valve 54, is controlled, for example by the same electronic control unit 22, so as to appropriately choke the mixing inlets to obtain a desired adjustment of the temperature of the mixed electrolytic fluid at the fluid outlet 55.

In the embodiment illustrated in FIG. 7, the electronic control unit 22 is arranged outside the chamber 42, in the "dry" zone, not contacting the electrolytic fluid and the seawater.

In a way herein not discussed in detail, the control unit 22 can be configured so as to implement a closed-loop control of the actuator 59 of the thermostatic valve 54, depending on a reference signal (representing a target value for the outlet temperature and/or a target value of a magnitude associated to such outlet temperature, for example a desired electric power which is to be provided to the electrochemical power supply 1) and on one or more detection signals (provided for example by a temperature sensor, such as a thermocouple, coupled at the fluid outlet 55 to detect the outlet temperature of the electrolytic fluid obtained from the mixing by the thermostatic valve 54, and/or a position sensor coupled to the actuator 59 of the same electrostatic valve 54, to detect an actuating position thereof). The aforesaid reference signal can be for example generated by the main management electronic unit (not herein illustrated) of the underwater vehicle 1, for example based on the desired power which has to be provided by the associated power supply source 1 in the various operating conditions.

The advantages of the present solution are clear from the previous description.

It is underlined however that the described solution allows to improve the efficiency of the electrochemical-type power supply source 1, increasing the energy yield and duration thereof, particularly in case it is used in underwater vehicles wherein it is required to generate a variable power depending on the needs of the same underwater vehicles.

The present solution allows in particular to increase the operating distance of the corresponding underwater vehicle (for example the launching distance in case of missions where the low-speed phase is the most important part, i.e. launches from high distance); analogously, the distance being equal, the present invention allows to save energy to be spent in the final step of the mission (i.e. target attack, in the case of a torpedo), to be generally performed at high speed.

It is clear that changes and variations can be made to what herein described and illustrated without departing from the scope of the present invention, as defined in the appended claims.

In particular, it is underlined that the constructive features of the valve system 20 and corresponding inlet and outlet valve arrangements 24, 25 can vary, for example depending on the available technology solutions, spaces or environmental working conditions, therefore being possible to identify different technical solutions, however functionally equivalent to what above described.

It is further highlighted that the valve system 20 may in principle comprise only the inlet valve arrangement 24, or accordingly, only the outlet valve arrangement 25, in order to modify the electric and hydraulic characteristics of the electrolytic fluid circulation pipes in the electrochemical stack 2, at the expense, however, of an unbalance in the fluid path between introduction into, and output from the electrochemical stack 2.

Furthermore, as incidentally previously highlighted, the recirculation system which allows the electrolytic fluid circulation between the electrochemical stack 2 and the main tank 5 may comprise different and additional elements with respect to what previously described.

Finally, it is noted once again that the present solution is advantageously applicable to increase the efficiency of a general electrochemical-type power supply source 1, for example to be used in a marine environment inside a generic underwater vehicle, which can also differ from the torpedo previously specifically referred to, as for instance it can advantageously be used inside a so-called Underwater Autonomous Vehicle (UAV).

The invention claimed is:

1. An electrochemical-type power supply source (1), comprising:
   an electrochemical stack (2), configured to generate electric power, in the presence, internally, of electrolytic fluid, having a number (n) of distinct groups of galvanic cells (4) and a corresponding number of electrolyte inlet pipes (8) for the introduction of electrolyte into the respective groups of galvanic cells (4) and electrolyte outlet pipes (9) for the extraction of electrolyte from the respective groups of galvanic cells (4);
   a main tank (5), fluidically coupled to said electrochemical stack (2) and designed to contain electrolytic fluid; and
   a recirculation system (6, 10), configured to establish a circulation path for circulation of the electrolytic fluid between said main tank (5) and said electrochemical stack (2), characterized by comprising a valve system (20), coupled to said electrolyte inlet pipes (8) and/or electrolyte outlet pipes (9) and operatively controllable to jointly modify hydraulic and electrical characteristics of the electrolytic-fluid circulation path, in response to a change of a power delivery condition by said power supply source (1);
   wherein said valve system (20) comprises:
   an inlet valve arrangement (24), for each electrolyte inlet pipe (8), coupled to the input of the respective electrolyte inlet pipe (8); and
   an outlet valve arrangement (25), for each electrolyte outlet pipe (9), coupled to the output of the respective electrolyte outlet pipe (9);
   wherein each inlet valve arrangement (24) and each outlet valve arrangement (25) defines a respective inlet (IN) and a respective outlet (OUT) for the electrolytic fluid and comprises:
   a direct fluidic path (26), which fluidically connects the respective inlet (IN) and the respective outlet (OUT) through a first path with a first length/section ratio;
   a secondary fluidic path (27), which fluidically connects the respective inlet (IN) and the respective outlet (OUT) by means of a second path with a second length/section ratio, wherein the second length/section ratio is greater than the first length/section ratio;
   a valve device (28), operable in a first position in which it closes, alternatively in a second position in which it opens, said direct fluidic path (26) between said inlet (IN) and said outlet (OUT),
   wherein said secondary fluidic path (27) is traversed by said electrolytic fluid, in the closing position of said direct fluidic path (26) by said valve device (28).

2. The power supply source according to claim 1, wherein said recirculation system (6, 10) comprises:
   a delivery device (6) coupled to said electrolyte inlet pipes (8) for introducing said electrolytic fluid into said electrochemical stack (2); and
   a conditioning device (10) coupled to said electrolyte outlet pipes (9) for conditioning operations of the electrolytic fluid extracted from said electrochemical stack (2), wherein each inlet valve arrangement (24) is coupled to the input of the respective electrolyte inlet pipe (8), downstream of the delivery device (6); and each outlet valve arrangement (25) is coupled to the output of the respective electrolyte outlet pipe (9), upstream of the conditioning device (10).

3. The power supply source according to claim 1, further comprising an electronic control unit (22) configured to control the valve device (28) of the inlet and outlet valve arrangements (24, 25) of said valve system (20), as a function of the power delivery condition;
   wherein, in a low-power delivery condition by said power supply source (1), the electronic control unit (22) controls the valve device (28) in said first position, so that the flow of the electrolytic fluid between the inlet (IN) and the outlet (OUT) of the respective inlet (24) and/or outlet (25) valve arrangement takes place through the secondary fluidic path (27), having a high length/section ratio, so as to increase the electrical resistance, at the same time increasing the hydraulic pressure loss; and wherein, in a medium/high-power delivery condition by the power supply source (1), the electronic control unit (22) controls the valve device (28) in the second position, so that the flow of the electrolytic fluid between the inlet (IN) and the outlet (OUT) of the respective inlet (24) and/or outlet (25) valve arrangement occurs through the direct fluidic path (26), having a high section and low length, so as to reduce the electrical resistance, at the same time reducing the hydraulic pressure loss.

4. The power supply source according to claim 3, wherein said electronic control unit (22) is configured to provide the command for switching from the first position to the second position simultaneously on all the inlet and outlet valve arrangements (24, 25), upon switching from the low-power delivery condition to the medium/high-power delivery condition by said power supply source (1).

5. The power supply source according to claim 1, wherein each inlet and outlet valve arrangement (24, 25) comprises a main body (30) having a longitudinal extension, an outer wall (31) and, internally, to said outer wall (31), a fluidic duct which defines said primary fluidic path (26); wherein, in said outer wall (31) a coiled duct is formed which defines said secondary fluidic path (27); and wherein said valve device (28) comprises a shutter (32) arranged centrally with respect to the main body (30) and having a cavity (33) coaxial with said primary fluidic path (26), controllable in rotation by an actuator (34) between a first position, in which it closes said primary fluidic path (26), forcing the electrolytic fluid to flow along said secondary fluidic path (27), and a second position, in which it opens said primary fluidic path (26), which is then traversed by the electrolytic fluid.

6. The power supply source according to claim 2, further comprising a second tank (48), configured to contain electrolytic fluid at a temperature lower than the temperature of the electrolytic fluid in the main tank (5); wherein said conditioning device (10) comprises at least one of the following: a heat exchanger (42) which fluidically connects said main tank (5) and said second tank (48), cooling electrolytic fluid drawn from said main tank (5) which is introduced into said second tank (48); a fluid-gas separator (50), having an inlet which receives electrolytic fluid drawn from the inside of said electrochemical stack (2), and an outlet for the outflow of liquid separated from the reaction gas; and wherein said pump device (6) is coupled to said separator (50) and is configured to re-introduce the liquid into said main tank (5).

7. The power supply source according to claim 1, wherein said electrolyte inlet and outlet pipes (8, 9) have a circular arrangement around an axis of longitudinal extension.

8. The power supply source according to claim 1, wherein said electrolyte inlet and outlet pipes (8, 9) have a linear arrangement in a direction transverse to an axis of longitudinal extension.

9. An underwater vehicle (40), comprising the power supply source (1) according to claim 1.

10. The vehicle according to claim 9, being a torpedo and comprising a propulsion system (43); wherein said power supply source (1) is configured to supply electrical power to said propulsion system (43).

11. The power supply source according to claim 1, wherein said valve system (20), in a low-power delivery condition by said power supply source (1), is controllable to increase an electrical resistance associated with said circulation path, with respect to a medium/high-power delivery condition by said power supply source (1).

12. The power supply source according to claim 1, further comprising an electronic control unit (22) configured to reduce a flow rate of said electrolytic fluid in said circulation path in said low-power delivery condition, with respect to the medium/high-power delivery condition by said power supply source (1).

13. The power supply source according to claim 11, wherein said valve system (20), in said medium/high-power delivery condition by said power supply source (1), is controllable to reduce the electric resistance of said circulation path, with respect to said low-power delivery condition by said power supply source (1); and wherein said electronic control unit (22) is further configured to increase the flow rate of said electrolytic fluid in said circulation path, in said medium/high-power delivery condition, with respect to said low-power delivery condition by said power supply source (1).

* * * * *